US009290090B2

(12) United States Patent
Montesano et al.

(10) Patent No.: US 9,290,090 B2
(45) Date of Patent: Mar. 22, 2016

(54) VENTILATION ASSEMBLY (75) Inventors: Donato Montesano, Asti (IT); Davide Volpin, Asti (IT)

(73) Assignee: GATE S.R.L., Turin (IT)

( * ) Notice: Subject to any disclaimer, the term of this patent is extended or adjusted under 35 U.S.C. 154(b) by 684 days.

(21) Appl. No.: 13/357,921

(22) Filed: Jan. 25, 2012

(65) Prior Publication Data

US 2012/0189474 A1  Jul. 26, 2012

(30) Foreign Application Priority Data

Jan. 25, 2011 (IT) .............................. TO2011A0057

(51) Int. Cl.
| | |
|---|---|
| F04D 19/00 | (2006.01) |
| B60K 11/02 | (2006.01) |
| F01P 5/04 | (2006.01) |
| F04D 25/06 | (2006.01) |
| F28F 9/00 | (2006.01) |
| B60K 11/04 | (2006.01) |
| F28D 21/00 | (2006.01) |

(52) U.S. Cl.
CPC . *B60K 11/02* (2013.01); *F01P 5/04* (2013.01); *F04D 19/002* (2013.01); *F04D 25/068* (2013.01); *F28F 9/002* (2013.01); *B60K 11/04* (2013.01); *F01P 2070/50* (2013.01); *F28D 2021/0094* (2013.01)

(58) Field of Classification Search
CPC ... F04D 25/068; F04D 25/0693; F04D 29/40; F04D 29/52; F04D 29/522; F04D 19/002; B60K 11/02; B60K 11/04; F01P 5/04; F01P 2070/50; F28F 9/002; F28D 2021/0094
USPC ................................. 417/423.8, 423.14, 360
See application file for complete search history.

(56) References Cited

U.S. PATENT DOCUMENTS

| | | | |
|---|---|---|---|
| 5,947,189 A * | 9/1999 | Takeuchi et al. ................ 165/51 |
| 6,587,342 B1 * | 7/2003 | Hsu ................................. 361/695 |
| 6,840,743 B2 * | 1/2005 | Herke et al. ...................... 417/2 |
| 2008/0202453 A1 | 8/2008 | Ewert et al. | |

FOREIGN PATENT DOCUMENTS

FR   2772844 A1   6/1999

* cited by examiner

*Primary Examiner* — Nathan J Newhouse
*Assistant Examiner* — Philip Stimpert
(74) *Attorney, Agent, or Firm* — Muncy, Geissler, Olds & Lowe, P.C.

(57) ABSTRACT

A ventilation assembly for a heat exchanger of a motor vehicle, has plate-like support structure with a main flow opening. A ventilator, including an electric motor and a fan, is mounted in the main flow opening. A voltage regulating device is fixed to the support structure and connected to the electric motor. The voltage regulating device has a support casing and a heat dissipater connected to the support casing. The voltage regulating device is fixed to the support structure in the region of but outside of the main flow opening, with the support casing and the heat dissipater being disposed in planes which are at least approximately parallel with the axis of the fan and of the main flow opening.

11 Claims, 6 Drawing Sheets

VENTILATION ASSEMBLY

CROSS REFERENCE TO RELATED APPLICATIONS

This non-provisional patent application claims priority under 35 U.S.C. §119(a) from Patent Application No. TO 2011 A 000057 filed in Italy on Jan. 25, 2011.

FIELD OF THE INVENTION

This invention relates to a ventilation assembly for a heat exchanger, for example, a radiator, of a motor vehicle. Such ventilation assemblies are also known as cooling fan modules.

More specifically, the invention relates to a ventilation assembly of the type comprising: a support structure or cowl, which is substantially plate-like and in which a main flow opening or passage is constructed, a motorized ventilator including a fan or vaned impeller which is mounted rotatably in the main opening or passage and an electric driving motor which is carried by the support structure and which is operatively connected to the fan and a voltage regulating device which is fixed to a support structure and which is connected to the electric motor, the voltage regulating device comprising a support casing which has a thickness which is smaller than the other dimensions thereof and to which there is connected a substantially plate-like heat dissipater which is substantially orthogonal to the direction of the thickness of the casing.

BACKGROUND OF THE INVENTION

In ventilation assemblies of this type, as constructed until now, the voltage regulating device is carried by the support structure or cowl in a position facing or internal with respect to the main flow opening or passage. That solution involves an increase in the operating noise and the introduction of an undesirable fluid-dynamic resistance.

Therefore, an object of the present invention is to construct a ventilation assembly which allows the disadvantages set out above in respect of the solutions according to the prior art to be overcome.

SUMMARY OF THE INVENTION

Accordingly, in one aspect thereof, the present invention provides a ventilation assembly for a heat exchanger of a motor vehicle, comprising: a substantially plate-like support structure, in which there is constructed a main flow opening; a motorized ventilator including a bladed impeller or fan rotatably mounted in the main flow opening and an electric motor carried by the support structure and operatively coupled to the fan; and a voltage regulating device fixed to the support structure and connected to the electric motor, the voltage regulating device comprising a support casing having a thickness (t) which is smaller than the other dimensions thereof, and to which there is connected a substantially plate-like heat dissipater, which is substantially orthogonal to the direction of the thickness (t) of the casing, wherein the voltage regulating device is fixed to the support structure in the region of but outside of the main flow opening, with the support casing and the heat dissipater being disposed in planes which are at least approximately parallel with the axis of the fan and of the main flow opening.

Preferably, the support structure defines a seat adapted to receive the voltage regulating device in a direction parallel with the axis of the fan.

Preferably, the seat comprises at least one guide in which the voltage regulating device is slidingly engageable/disengageable, and locking means adapted to fix the voltage regulating device in the engaged condition in the at least one guide.

Preferably, the locking means comprise a fixing device, preferably of a removable type, engageable in a hole or opening of the support structure after engaging the fixing device through an opening of a retaining formation of the voltage regulating device.

Preferably, the fixing hole is parallel with the axis of the fan.

Preferably, the fixing device is a screw.

Alternatively, the locking means comprise snap-coupling means between the voltage regulating device and the support structure.

Preferably, the snap-coupling means comprise an opening provided in an attachment of the voltage regulating device, and a projection of the support structure engageable in the aperture.

Preferably, the attachment extends opposite and parallel with the guide, with respect to the heat dissipater, and the projection is substantially orthogonal to the attachment; the support structure being provided with a flexible transverse retaining fin, substantially parallel with the projection and adapted to maintain the attachment in the condition of engagement with the projection, and able to be deflected in such a manner as to allow the disengagement of the attachment from the associated projection, substantially by means of a rotation of the voltage regulating device about an axis parallel with the axis of the fan and in the region of the guide.

Preferably, the voltage regulating device is mounted through a secondary opening constructed in the support structure in the region of the main flow opening in such a manner that the rotation of the fan is capable of inducing a flow of air through the secondary opening that can travel over the heat dissipater of the voltage regulating device.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

There is generally designated 1 in the drawings a ventilation assembly according to the present invention for a (at least one) heat exchanger, for example a radiator, of a motor vehicle provided with an internal-combustion engine. Such a ventilation assembly is also known as a cooling fan module.

The ventilation assembly 1 comprises a support structure 2 in the form of a cowl, which is substantially plate-like and which is constructed, for example, from a molded plastics material. The support structure 2 defines a main flow opening 3 which may be in the form of a passage through the support structure.

Figure 1:
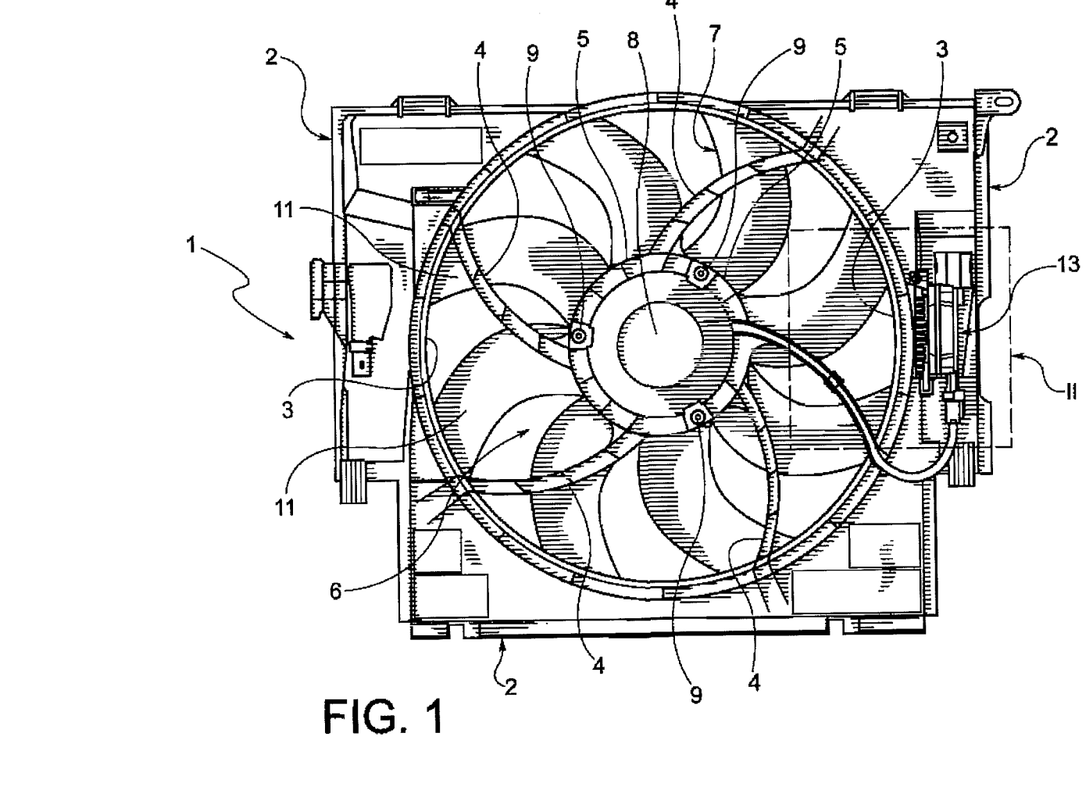
FIG. 1 is a front view of a ventilation assembly according to the present invention.

As can be seen in particular in FIG. 1, at the peripheral edge of the opening 3, a plurality of arcuate struts 4 which are integral with the support structure 2 extend towards the center of that opening. The radially innermost ends of the struts 4 are connected with a ring 5 which is advantageously constructed so as to be integral therewith. Preferably the struts, ring and support structure are formed as a monolithic construction.

The ventilation assembly 1 further comprises a motorized ventilator which is generally designated 6. The motorized ventilator 6 comprises a fan or vaned impeller 7 which is mounted rotatably in the main flow opening 3 and an associated electric motor 8 which is fixed to the ring 5, for example, by means of a plurality of screws 9.

Figure 3:
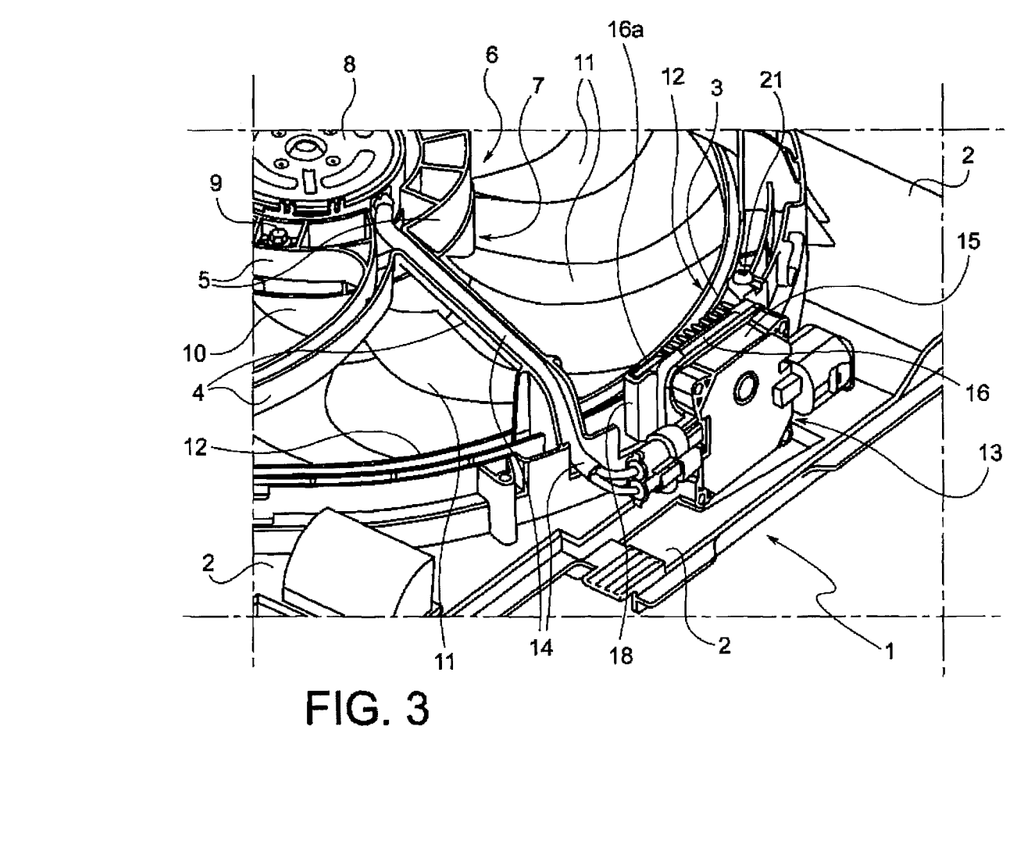
FIG. 3 is a partial perspective view of the ventilation assembly according to the preceding Figs.

In a manner known per se, the impeller or fan 7 comprises a central hub 10 (FIG. 3) which is substantially of cup-like form and from the outer surface of which there extend a plurality of arcuate vanes 11, which preferably have the distal ends connected to a peripheral ring 12. The hub 10 of the fan 7 is connected to the shaft of the electric motor 8.

In the drawings, there is generally designated 13 a voltage regulating device which is associated with the electric motor 8, to which it is connected by means of a multicore cable 14 (which can be seen in particular in FIG. 3) which advantageously extends in a channel-like recess provided in one of the struts 4.

The voltage regulating device is fixed, preferably in a manner which can be disassembled, to the support structure 2 in manners which will be described in greater detail below. The voltage regulating device 13 comprises a support casing 15 which is of substantially parallelepipedal shape and which has a thickness t (FIGS. 4 and 6) which is less than the other dimensions thereof. A substantially plate-like heat dissipater 16 extends substantially orthogonally relative to the direction of the thickness t of the casing 15 and is connected to a main surface or face of the casing 15. As can be seen more clearly in FIGS. 2, 4 and 5, at the side directed towards the axis of the fan 6, the dissipater 16 has a plurality of protuberances 16a.

Figure 2:
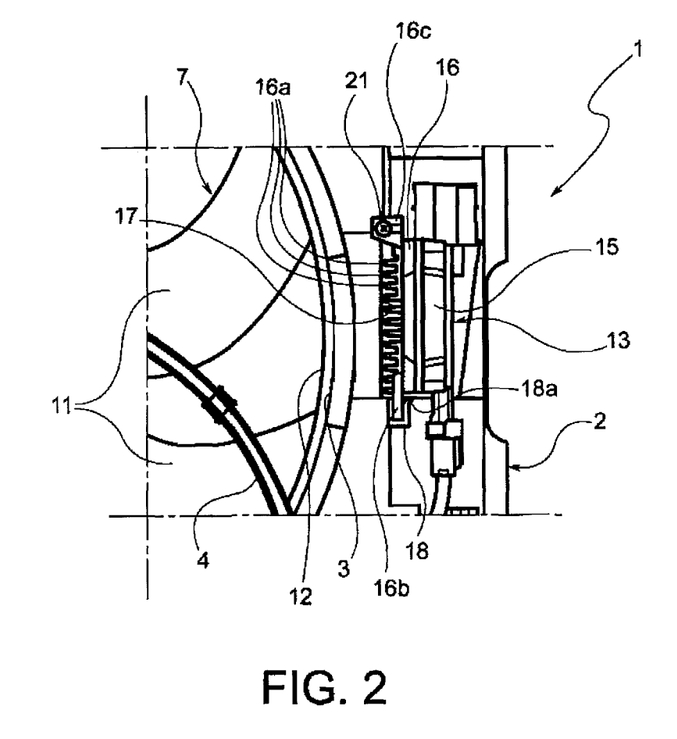
FIG. 2 shows, drawn to an enlarged scale, the detail indicated II in FIG. 1.
Figure 5:
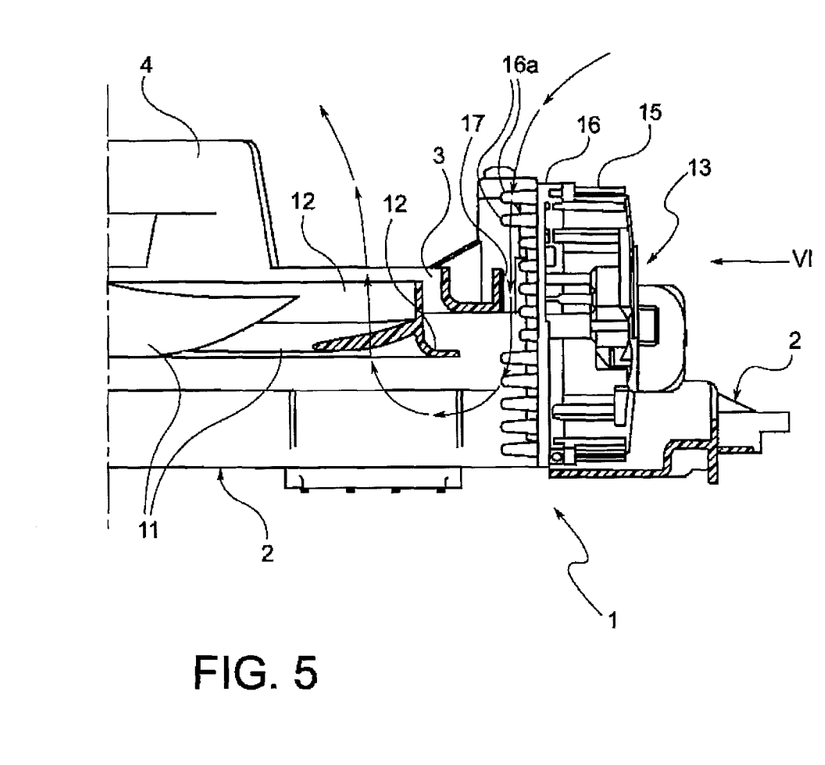
FIG. 5 is a cross-section in accordance with the line V-V of FIG. 4.

With reference to FIGS. 2 and 5, the voltage regulating device 13 extends through a secondary opening 17 in the support structure 2 near the main flow opening 3. The arrangement is such that, during operation, the rotation of the impeller or fan 7 is such as to draw a secondary air flow in accordance with the course indicated by the arrows of FIG. 5 and that flow travels over the dissipater 16.

In the mounted condition, the voltage regulating device and the associated heat dissipater 16 extend in planes which are at least approximately parallel with the axis of rotation of the fan or impeller 7 and the main flow opening 3.

In order to mount the voltage regulating device 13 in the support structure 3, a suitable seat is provided. That seat is preferably constructed so as to allow introduction of the regulating device 13 and the associated dissipater in accordance with a direction parallel with the axis of rotation of the fan 7.

In the construction illustrated in FIGS. 1 to 5, the seat comprises a guide 18 (which can be seen in particular in FIGS. 3 and 4) having a channel-like configuration with the concavity directed towards the dissipater 16. The guide 18 extends substantially orthogonally relative to the general plane of the support structure 2 and the side wall thereof or edge disposed at the side opposite the main flow opening 3 has the distal edge 18a (FIG. 4) inclined outwards. A fin or lateral attachment 16b of the heat dissipater 16 can be slidingly engaged with/disengaged from the guide 18.

Figure 4:
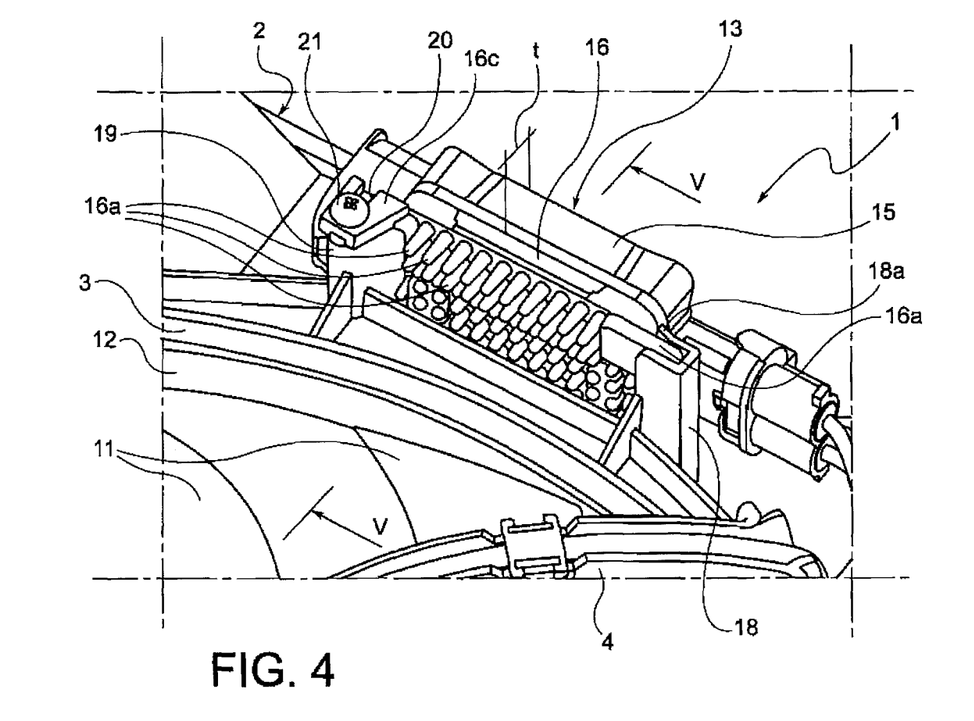
FIG. 4 is another partial perspective view which shows the mounting of a voltage regulating device.

The mounting seat of the voltage regulating device 13 and the associated heat dissipater 16 further comprises a protuberance or projection 19 (FIG. 4) which is integral with the support structure 2 and on which, in the mounted condition, there is juxtaposed an attachment 16c of the heat dissipater 16 provided with an opening or slot 20 (FIG. 4). During assembly, a screw 21 is engaged through the opening 20 and is screwed into a corresponding hole provided in the projection 19 to fix the voltage regulating device. During assembly, the screw 21 can readily be screwed in position by a tool which engages the screw in a direction parallel with the axis of the fan 7.

The assembly and the locking of the voltage regulating device 13 and the associated heat dissipater 16 in the support structure 2 are extremely easy and can be brought about in particular by means of automated assembly and mounting devices.

Figure 6:
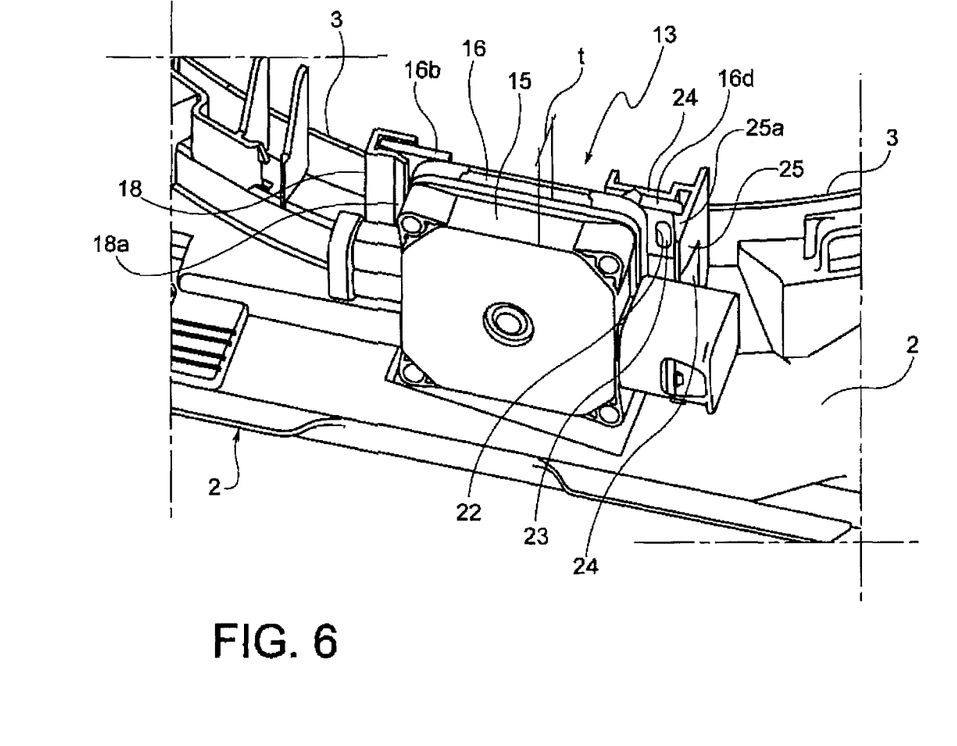
FIG. 6 is a partial perspective view in accordance with arrow VI of FIG. 5, showing a variation of the mounting arrangement of the voltage regulating device.

FIG. 6 illustrates a construction variant of the mounting of the voltage regulating device 13 and the associated dissipater 16. In FIG. 6, the same reference numerals previously used have again been attributed to parts and elements already described. The construction variant according to FIG. 16 differs from the one described above substantially with regard to the method of locking the voltage regulating device 13 and the dissipater 16 in the assembly position.

To that end, the dissipater 16 has an attachment 16d which extends substantially parallel with the axis of the impeller or fan 7 and which is provided with an opening or slot 22, in which it is possible to insert in a snap-fitting manner a projection 23 which extends from an upright 24 which is integral with the support structure 2 and which extends from that structure parallel with the guide 18. The projection 23 engages in the opening or slot 22 when the assembly formed by the voltage regulating device 13 and the associated heat dissipater 16 reaches the desired assembly position.

The distal end of the fin or attachment 16d is further fixed in position by a terminal tooth 25a of a transverse retention fin 25 which is flexible and which extends in a direction substantially parallel with that of the projection 23.

The arrangement in such that the voltage regulating device 13 and the associated heat dissipater 16 can be readily dismounted, after deflection of the fin 25 (to the right when FIG. 6 is viewed) until the attachment 16d of the dissipater is disengaged from the terminal tooth 25a of the fin. Once that condition is fulfilled, the assembly comprising the voltage regulator 13/dissipater 16 may be rotated in the direction of the viewer of FIG. 6 about an axis parallel with the axis of the fan 7 and near the guide 18 so as to bring about disengagement of the projection 23 from the slot 22 of the attachment 16d. Once that disengagement has been brought about, the voltage regulating device 13 and the associated dissipater can be readily disengaged from the sliding guide 16.

In the variant according to FIG. 6, the assembly including the voltage regulator 13 and the associated dissipater 16 may also be readily mounted and dismounted with the use of automatic devices.

The specific arrangement of the assembly in a position substantially parallel with the axis of the impeller 7 in the region of but outside the main flow opening 3 allows a reduction in the acoustic operating noise as well as the fluid-dynamic resistance owing to the presence of that assembly.

Although the invention is described with reference to one or more preferred embodiments, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. A ventilation assembly for a heat exchanger of a motor vehicle, comprising:
    a substantially plate-like support structure, in which there is constructed a main flow opening;
    a motorized ventilator including a bladed impeller or fan rotatably mounted in the main flow opening and an electric motor carried by the support structure and operatively coupled to the fan; and
    a voltage regulating device fixed to the support structure and connected to the electric motor, the voltage regulating device comprising a support casing having a thickness (t) and a main surface substantially orthogonal to the direction of the thickness (t), and a heat dissipater connected to the main surface of the support casing,
    wherein the voltage regulating device is fixed to the support structure in the peripheral region of but outside of the main flow opening, with the main surface of the support casing at least approximately parallel with a rotation axis of the fan and of the main flow opening;
    wherein the support casing and the heat dissipater extend through a secondary opening constructed in the support structure in the region of the main flow opening in such as manner that the rotation of the fan is capable of inducing a secondary air flow of air through the secondary opening that travels over the heat dissipater of the voltage regulating device;
    wherein in the support structure there is provided a seat adapted to receive the voltage regulating device in a direction parallel with the axis of the fan;
    wherein the seat comprises at least one guide in which the voltage regulating device is slidingly engageable/disengageable, and locking means adapted to fix the voltage regulating device in the engaged condition in the at least one guide;
    wherein the locking means comprises snap-coupling means between the voltage regulating device and the support structure;
    wherein the snap-coupling means comprises an opening provided in an attachment of the voltage regulating device, and a projection of the support structure engageable in the aperture; and
    wherein the attachment extends opposite and parallel with the guide, with respect to the heat dissipater, and the projection is substantially orthogonal to the attachment; the support structure being provided with a flexible transverse retaining fin, substantially parallel with the projection and adapted to maintain the attachment in the condition of engagement with the projection, and able to be deflected in such a manner as to allow the disengagement of the attachment from the associated projection, substantially by means of a rotation of the voltage regulating device about an axis parallel with the axis of the fan and in the region of the guide.

2. The assembly of claim 1, wherein the guide has a channel-like configuration with a concavity extending in a direction substantially parallel with the rotation axis of the fan.

3. The assembly of claim 2, wherein the voltage regulating device has a lateral attachment axially slidably received in the concavity of the guide.

4. The assembly of claim 3, wherein the lateral attachment is formed on the heat dissipater.

5. The assembly of claim 1, wherein the guide extends substantially orthogonally relative to a general plane of the support structure which is orthogonal to the rotational axis of the bladed impeller or fan and a side wall thereof or edge disposed at the side opposite the main flow opening has a distal edge inclined outwards.

6. The assembly of claim 1, wherein an air flow direction of the secondary air flow is parallel to the axis of the fan when the secondary air flow travels the heat dissipater.

7. A ventilation assembly for a heat exchanger of a motor vehicle, comprising:
    a support structure, in which there is constructed a main flow opening;
    a motorized ventilator including a bladed fan rotatably mounted in the main flow opening and an electric motor carried by the support structure and operatively coupled to the fan; and
    a voltage regulating device fixed to the support structure and electrically connected to the electric motor by connectors, the voltage regulating device comprising a support casing, and a heat dissipater connected to the supporting casing,
    wherein the voltage regulating device is fixed to a seat of the support structure, the seat and the voltage regulating device comprise mounting means to mount the voltage regulating device to the seat, and wherein the mounting means comprise a channel like guide with a concavity and a lateral attachment slidably received in the concavity; and
    wherein the seat and the voltage regulating device comprise locking means to fix the voltage regulating device in the guide, and the locking means comprises snap-coupling means between the voltage regulating device and the support structure, the snap-coupling means comprises an opening provided in an attachment of the voltage regulating device, and a projection of the support structure engageable in the aperture, the attachment extends opposite and parallel with the guide, with respect to the heat dissipater, and the projection is substantially orthogonal to the attachment; the support structure being provided with a flexible transverse retaining fin, substantially parallel with the projection and adapted to maintain the attachment in the condition of engagement with the projection, and able to be deflected in such a manner as to allow the disengagement of the attachment from the associated projection, substantially by means of a rotation of the voltage regulating device about an axis parallel with the axis of the fan and in the region of the guide.

8. The assembly of claim 7, wherein the casing having a thickness (t), and the direction of the thickness (t) of the casing is substantially orthogonal to a rotation axis of the fan.

9. The assembly of claim 7, wherein the voltage regulating device is mounted through a secondary opening constructed in the support structure in the region of the main flow opening in such a manner that the rotation of the fan is capable of inducing a flow of air through the secondary opening that can travel over the heat dissipater of the voltage regulating device.

10. The assembly of claim 7, wherein the guide extends substantially orthogonally relative to a general plane of the support structure which is orthogonal to the rotational axis of the bladed fan and a side wall thereof or edge disposed at the side opposite the main flow opening has a distal edge inclined outwards.

11. A ventilation assembly for a heat exchanger of a motor vehicle, comprising:
   a substantially plate-like support structure, in which there is constructed a main flow opening;
   a motorized ventilator including a bladed impeller or fan rotatably mounted in the main flow opening and an electric motor carried by the support structure and operatively coupled to the fan; and
   a voltage regulating device fixed to the support structure and connected to the electric motor, the voltage regulating device comprising a support casing having a thickness (t) and a main surface substantially orthogonal to the direction of the thickness (t), and a heat dissipater connected to the main surface of the support casing,
   wherein the voltage regulating device is fixed to the support structure in the peripheral region of but outside of the main flow opening, with the main surface of the support casing at least approximately parallel with a rotation axis of the fan and of the main flow opening;
   wherein in the support structure there is provided a seat adapted to receive the voltage regulating device in a direction parallel with the axis of the fan;
   wherein the seat comprises at least one guide in which the voltage regulating device is slidingly engageable/disengageable, and locking means adapted to fix the voltage regulating device in the engaged condition in the at least one guide;
   wherein the locking means comprises snap-coupling means between the voltage regulating device and the support structure;
   wherein the snap-coupling means comprises an opening provided in an attachment of the voltage regulating device, and a projection of the support structure engageable in the aperture; and
   wherein the attachment extends opposite and parallel with the guide, with respect to the heat dissipater, and the projection is substantially orthogonal to the attachment; the support structure being provided with a flexible transverse retaining fin, substantially parallel with the projection and adapted to maintain the attachment in the condition of engagement with the projection, and able to be deflected in such a manner as to allow the disengagement of the attachment from the associated projection, substantially by means of a rotation of the voltage regulating device about an axis parallel with the axis of the fan and in the region of the guide.

* * * * *